Feb. 22, 1938.   H. GALLUSSER   2,109,419
ELECTRICALLY ACTUATED DEVICE FOR INCREASING THE BRAKING ACTION
Filed April 22, 1937   2 Sheets-Sheet 2

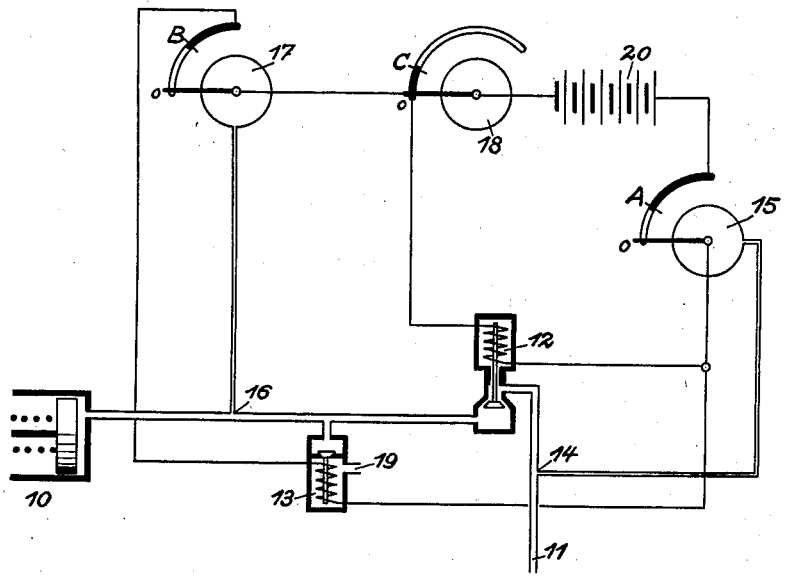
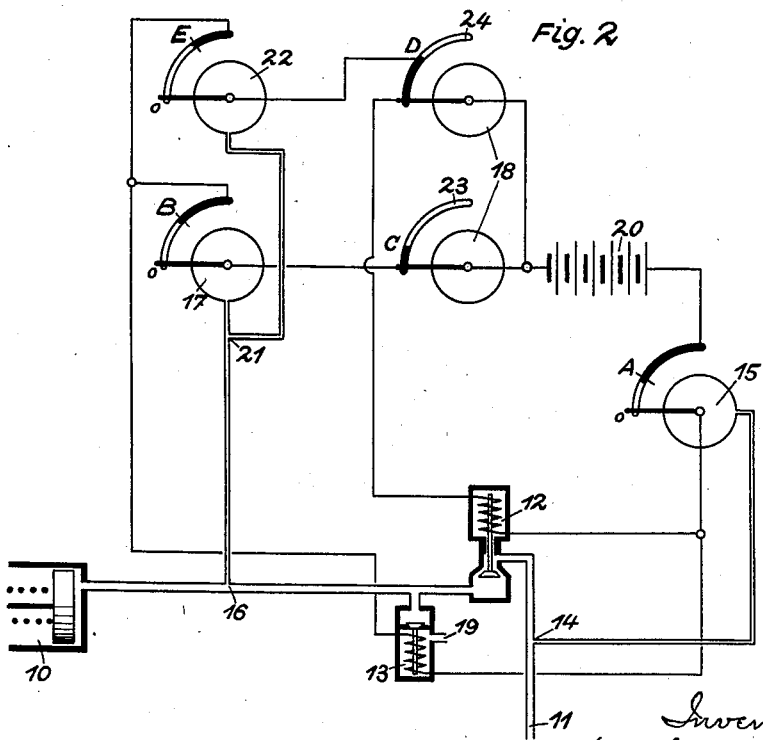

Patented Feb. 22, 1938

2,109,419

UNITED STATES PATENT OFFICE 2,109,419

ELECTRICALLY ACTUATED DEVICE FOR INCREASING THE BRAKING ACTION

Hans Gallusser, Geneva, Switzerland

Application April 22, 1937, Serial No. 138,469
In Germany March 30, 1937

9 Claims. (Cl. 303—21)

Devices are already well known for increasing the braking action of compressed air brakes at high speeds both in connection with arrangements having a single brake cylinder and in connection with those wherein there is also provided an auxiliary cylinder.

In all these devices the control is effected either in dependence on the pressure in the brake cylinders or on the speed of travel or on both of these conditions together. The control, depending on the speed of travel, is effected for example by centrifugal governors which, however, operate very inaccurately, as they are dependent too much on friction conditions. As a rule the control of the supply of compressed air is effected pneumatically or also in combination with an electrically actuated device. As a result these control devices became comparatively complicated and practice has shown that the pneumatic control cannot always be effected with the desired certainty and in the main not with the necessary precision so that all conditions can be satisfied.

The present invention relates to a device by means of which the above mentioned disadvantages are eliminated in that the supply of compressed air to the brake cylinder or cylinders or their discharge in stages is controlled automatically both in dependence on the pressure obtaining therein and on the speed of travel by valves solely supervised electrically thus excluding any frictional resistances so that skidding of the wheels will always be obviated.

Three forms of construction of the subject of the invention are shown diagrammatically by way of example in the accompanying drawings, wherein:

Fig. 1 shows one arrangement according to the invention.

Fig. 2 shows a second arrangement according to the invention, and

Figure 3:
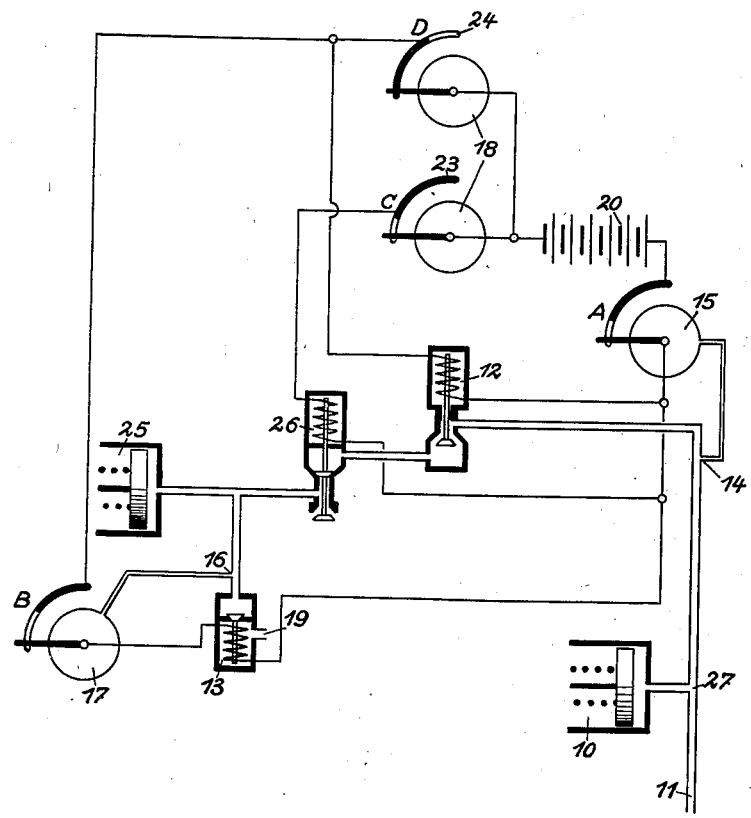
Fig. 3 shows a third arrangement according to the invention.

In the arrangement shown in Fig. 1 there is provided only a single brake cylinder 10 which is connected to the control valve by a pipe 11. The latter includes two electrically operated valves 12 and 13. Between the control valve, not shown in the drawings, and the valve 12 there is connected to the pipe 11 at 14 a gauge 15 and between the valve 12 and the brake cylinder 10 a gauge 17 is connected to the pipe 11 at 16. The valve 13 is provided with an outflow port 19.

There is also provided a speedometer 18.

Both the gauges 15 and 17 and the speedometer 18 actuate electrical contacts by which the circuits of the electrically operated valves 12 and 13 are closed and opened. As a source of current there is for example provided the lighting battery 20.

The method of operation of the device is as follows:

In the position of rest shown in the drawings, that is to say when no current flows through the electromagnets of the valves 12 and 13, the first is open and the second is closed. When, however, the circuits of the electromagnets in these valves are closed, the valve 12 is closed and the valve 13 is opened. The arrangement is such that the contact in the gauge 15 is closed at A when a pressure obtains in the pipe 11 which is for example greater than 2 atmos. The contact of the gauge 17 is not closed at B until a higher pressure, for example a pressure of 2.5 atmos. The pressure for closing the contacts of the two gauges may be made larger or smaller, but the gauge 17 must close its contact only at a pressure which is from 0.2 to 0.5 atmos. higher than that of the gauge 15.

The contact on the speedometer 18 is closed during the stationary position and is opened at C for example at a predetermined speed of 20 miles.

When now complete braking is to be effected at a high speed the brake cylinder 10 receives the full pressure, for example 4 atmos. At the same time the contacts in the two gauges 15 and 17 are closed. By reason of the braking action the speed is reduced and when it has been reduced to the value, for example of 20 miles per hour, the contact in the speedometer 18 is closed whereby the circuit through the two valves 12 and 13 is closed. The valve 12 shuts off the supply of air and through the valve 13 compressed air passes from the cylinder into the atmosphere through the outlet port 19 until the pressure has been reduced for example to 2.5 atmos. At this moment the contact in the gauge 17 is broken at B, and therewith also the circuit of the valve 13, which immediately closes, so that the pressure in the cylinder cannot be reduced further. When the brake is released the pressure is first reduced in the supply pipe 11. If it sinks below 2 atmos. the contact in the gauge 15 is opened and thus opens the circuit of the valve 12 whereby this valve opens and the compressed air can pass out of the brake cylinder 10 through the pipe 11. When the brake is applied at a low speed, of for example 12½ miles, compressed air passes directly into the cylinder 10. When the pressure of the air has risen to 2 atmos. the contact of the gauge 15 is closed at A. As the contact in the speedometer is still closed the circuit of the valve 12 is closed whereby the further supply of air to the brake cylinder 10 is shut off so that at the low speed only a small pressure can be produced in the cylinder thus obviating a locking of the wheels.

In connection with the arrangement described it will be understood that it is also possible to provide in combination therewith an auxiliary cylinder so as to form three braking stages.

It is also possible to obtain a three-stage braking action with a single cylinder by connecting one or more gauges to the circuit of the outlet valve. An arrangement for three stages is shown in Fig. 2.

The arrangement of the various members in this case is similar to that in Fig. 1 except that the speedometer 18 is provided with two contacts 23 and 24, of which the first is opened at C, for example at 20 miles, the second at D, for example only at 37 miles. (It will be understood that in practice only one speedometer 18 is provided but this has been shown in duplicate in the drawings for the sake of clearness.) This contact 24 is also included in the circuit of electrically actuated valve 12.

Further there is connected to the pipe leading to the gauge 17, at 21 a third gauge 22 of which the contact is closed at E for example at a pressure of 3.5 atmos. The circuit of the gauge 22 passes through the contact 24 and is connected to that of the gauge 17. It thus acts on the electrically actuated valve 13. The full pressure in the brake cylinder is in this case fixed, for example, at 5 atmos.

When applying the brakes fully the cylinder 10 first receives compressed air at 5 atmos. When the speed has been reduced to 37 miles the contact 24 of the speedometer 18 closes, at D, the circuit of the valve 13 as also the circuit of the valve 12. This latter shuts off the supply of air and the compressed air in the brake cylinder 10 can escape through the outlet port 19 of the valve 13 until the pressure has been reduced to 3.5 atmos. At this moment the circuit of the valve 13 is opened at E whereby this valve shuts off the supply of air and there remains in the cylinder a pressure of 3.5 atmos. When the speed has been reduced to 20 miles per hour the second contact of the speedometer 18 closes at C the circuit of the valve 13, which again allows compressed air to escape from the cylinder 10 until the pressure has been reduced to 2.5 atmos. at which pressure the valve, in consequence of the opening of the circuit at B, is again closed. When the brake is released the air first escapes from the pipe 11 until the gauge 15 opens the circuit of the valve 12 at A so that air can pass from the cylinder 10 through the pipe 11.

The multi-stage braking action may also be subdivided by auxiliary cylinders. An arrangement of this character is shown by way of example in Fig. 3.

As shown in Fig. 3 the brake cylinder 10 is connected at 27 to the pipe 11 connected to the control valve not shown. The pipe 11 leads through the electrically operated valves 12 and 26 to the auxiliary brake cylinder 25. To the pipe 11 there is connected, in front of the valve 12, at 14, a gauge 15 which actuates an electric contact which is closed at A for example at a pressure of 2 atmos.

Between the valve 26 and the auxiliary brake cylinder 25 there is provided on the pipe 11 an electrically actuated valve 13 with an outlet port 19. At 16 there is connected a gauge 17 which also actuates an electric contact which closes at B for example at a pressure of 2.5 atmos.

A speedometer 18 is provided with two electric contacts 23 and 24 of which the first is opened at C, for example at a speed of 20 miles and below, and the second is closed at D for example at a speed of 37 miles and below.

The circuit of the electrically actuated valve 12 passes from the lighting battery 20, through the contact of the gauge 15 and the contact 24 of the speedometer 18. When this circuit is closed the electrically actuated valve 12 shuts off the supply of air to the auxiliary cylinder 25.

The circuit of the valve 26 passes from the battery 20, through the contact of the gauge 15 and the contact 23 of the speedometer 18. When it is opened the valve 26 shuts off the supply of air to the auxiliary brake cylinder 25 and connects this latter simultaneously to the outer air.

When the circuit is closed the valve 26 connects the auxiliary cylinder to the compressed air pipe and shuts off the connection with the atmosphere.

The circuit of the valve 13 passes from the battery 20, through the contact 24 of the speedometer 18, and the contacts of the gauges 17 and 15. When it is closed the valve 13 connects the auxiliary brake cylinder 25 to the outlet port 19.

When applying the brakes fully at a high speed the cylinder 10 first receives the full pressure of for example 5 atmos. The circuit of the valve 26 is closed and compressed air at 5 atmos. can also pass into the auxiliary brake cylinder 25.

When in consequence of the braking action the speed has been reduced for example to 30 miles the contact 24 at this moment closes at D the circuits of the valves 12 and 13 so that simultaneously the air supply is shut off at 12 and the auxiliary cylinder 25 is connected at 13 to the outflow port 19 until the pressure is reduced for example to 2.5 atmos. By the contact of the gauge 15 the circuit of the valve 13 is then opened at B so that the outlet port 19 is again closed. The pressure of 2.5 atmos. is maintained until in consequence of the braking action the speed has been reduced for example to 20 miles. At this moment the contact 23 of the speedometer 18 opens the circuit of the valve 26 whereby the auxiliary cylinder 25 is connected to the atmosphere by the movement of the valve 26 in the opposite direction.

From this moment the further braking is again effected only through the brake cylinder 10.

It will be understood that the staging of the braking action may also be carried out in a similar manner with more than three stages.

I claim:

1. In a compressed air braking system for vehicles adapted to apply greater braking action at higher speeds of the vehicle, a source of compressed air, a brake motor, an air supply pipe connecting said compressed air source with the brake motor, a normally open valve in said pipe between the air source and brake motor, a second valve, normally closed, connected to said pipe between said source and said brake motor and to the atmosphere, electrical means for actuating each of said valves, electrical circuits in which said electrical valve actuating means are connected, a source of electricity connected in said circuits, a pressure responsive device connected to said air supply pipe and having an electrical contact device connected in both of said circuits, to close said circuits when the pressure in said pipe reaches a predetermined pressure, vehicle speed responsive means having an electrical contact device connected in the circuit of said first-mentioned valve to open said circuit when the speed exceeds a predetermined speed, whereby the actuating means of said first valve is controlled by its circuit to close said pipe when the pressure in the pipe is above a predetermined pressure while the vehicle speed is below a predetermined speed, a second pressure responsive device connected to said supply pipe between the first valve and said brake motor, said second pressure responsive device having an electrical contact device connected in the circuit of said second valve actuating means to close the second circuit when the pressure in said pipe between the first valve and the brake motor exceeds a predetermined pressure which is greater than the circuit closing pressure of the first-mentioned pressure responsive device, whereby said second valve is opened and allows discharge of air from said pipe and motor to atmosphere when the pressure in said pipe exceeds a predetermined pressure while the speed is below a predetermined speed.

2. A compressed air braking system for vehicles adapted to apply stronger braking at high speeds than at low speeds comprising a brake cylinder, a supply pipe for compressed air connected to said cylinder, two electrically actuated valves in said pipe, a pressure gauge connected to said pipe at a point between a source of supply of compressed air and said valves, a second gauge connected to said pipe between said valves and said brake cylinders, a speedometer including contacts, contacts on each of said gauges, an electric circuit including a source of current associated with said contacts and said valves, one of said valves being normally open and the other of said valves being normally closed, the contacts of one of the gauges being arranged to close before the contacts on the other gauge, the normally open valve being adapted to be closed when the contacts of one of the gauges and of the speedometer are in the closed position, whilst the normally closed valve is adapted to be opened when the contacts of both gauges and the contacts of the speedometer are in the closed position.

3. A compressed air braking system for vehicles adapted to apply stronger braking at high speeds than at low speeds comprising a brake cylinder, a supply pipe for compressed air connected thereto, two electrically actuated valves in said pipe, two gauges connected to said pressure pipe, contacts associated with said gauges, a speedometer, contacts associated with said speedometer, electric circuits including a source of current, the contacts of said gauges, the contacts of said speedometer and said electrically actuated valves, the circuits of the separate valves being only closed and opened when a predetermined pressure is indicated on said gauges and a predetermined speed is indicated on said speedometer.

4. A compressed air braking system for vehicles adapted to apply stronger braking at high speeds than at low speeds comprising a brake cylinder, a supply pipe for compressed air connected thereto, two electrically actuated valves in said pipe, two gauges connected to said pressure pipe, contacts associated with said gauges, a speedometer, contacts associated with said speedometer, electric circuits including a source of current, the contacts of said gauges, the contacts of said speedometer and said electrically actuated valves, the circuits of the separate valves being only closed and opened when a predetermined pressure is indicated on said gauges and a predetermined speed is indicated on said speedometer, one of said valves controlling the supply of compressed air to said brake cylinder, the second valve controlling the outflow of compressed air from said cylinder, the arrangement being such that the valve controlling the supply of compressed air to the cylinder remains operative up to a lower pressure limit than the valve controlling the outflow.

5. A compressed air braking system for vehicles adapted to apply stronger braking at high speeds than at low speeds comprising a brake cylinder, a supply pipe for compressed air connected to said cylinder, two electrically actuated valves in said pipe, a pressure gauge connected to said pipe at a point between a source of supply of compressed air and said valves, a second gauge connected to said pipe between said valves and said brake cylinders, a speedometer including contacts, contacts on each of said gauges, an electric circuit including a source of current associated with said contacts and said valves, one of said valves being normally open and the other of said valves being normally closed, the contacts of one of the gauges being arranged to close before the contacts on the other gauge, the normally open valve being adapted to be closed when the contacts of one of the gauges and of the speedometer are in the closed position, whilst the normally closed valve is adapted to be opened when the contacts of both gauges and the contacts of the speedometer are in the closed position, a third gauge with electrical contacts, and a further contact on said speedometer, the gauges being arranged to close their circuits at different pressures, whilst the two contacts of the speedometer are adapted to close at different speeds, the circuits of the valves being closed when the respective contacts associated therewith at the speedometer and gauges are closed.

6. A compressed air braking system for vehicles adapted to apply stronger braking at high speeds than at low speeds comprising a brake cylinder, a supply pipe for compressed air connected to said cylinder, two electrically actuated valves in said pipe, a pressure gauge connected to said pipe at a point between a source of supply of compressed air and said valves, a second gauge connected to said pipe between said valves and said brake cylinders, a speedometer including contacts, contacts on each of said gauges, an electric circuit including a source of current associated with said contacts and said valves, one of said valves being normally open and the other of said valves being normally closed, the contacts of one of the gauges being arranged to close before the contacts on the other gauge, the normally open valve being adapted to be closed when the contacts of one of the gauges and of the speedometer are in the closed position, whilst the normally closed valve is adapted to be opened when the contacts of both gauges and the contacts of the speedometer are in the closed position, an auxiliary cylinder connected to said pipe, a third normally closed electrically actuated valve associated with said pipe, an additional contact on said speedometer, the arrangement being such that the brake cylinder always receives the full braking pressure whilst only the supply of compressed air to the auxiliary cylinder is controlled automatically by the valves dependent on the pressure of air and on the speed of travel.

7. A device for increasing the braking action of compressed air brakes at high speeds comprising in combination with a brake cylinder and a pipe for the supply of compressed air to said brake cylinder, of a pair of electrically actuated valves in said pipe, one of said valves being normally open, whilst the second of said valves is normally closed, the normally open valve controlling the supply of compressed air to said brake cylinder, the normally closed valve controlling the discharge of compressed air from said cylinder to the atmosphere, a pressure gauge connected to said pipe on the inlet side of the normally open valve, contacts associated with said gauge, said contacts being adapted to close when a predetermined pressure is reached, a second gauge connected to said pipe between the normally closed valve and the brake cylinder, contacts on said gauge, said contacts being adapted to close at a higher pressure than the contacts of the first gauge, a speedometer, contacts associated with said speedometer, said contacts being adapted to remain closed over a predetermined range of speed, and an electric circuit including a source of current, the contacts on both of said gauges, the contacts of said speedometer, and said electrically actuated valves, the arrangement being such that when all the contacts are in the closed position the normally open valve is closed and the normally closed valve is opened, the normal conditions being restored as soon as any of the contacts move into the open position.

8. A device for increasing the braking action of compressed air brakes at high speeds comprising in combination with a brake cylinder and a pipe for the supply of compressed air, of two electrically actuated valves in said pipe, one of said valves when not energized being open, whilst the other when not energized being closed, a pressure gauge connected to said pipe in advance of said valve, contacts associated with said gauge, two further gauges connected to said pipe between said valves and said brake cylinder, contacts associated with each of said last mentioned gauges, the contacts of all of said gauges being so arranged that the contacts of the first mentioned gauge are in the open position at a lower pressure than the contacts of the two last mentioned gauges, the contacts of one of the last mentioned gauges being in the open position at a higher pressure than the other, a speedometer, two separate sets of contacts being associated with said speedometer, the said contacts remaining in the closed position for a predetermined speed which varies for the two sets of contacts, and an electrical circuit including a source of current, the contacts of the various gauges and of the speedometer, and the electrically actuated valves, the arrangement being such that the open valve is closed and the closed valve opened when the various contacts are in the closed position, but remain open and closed respectively when any one of the contacts is in the open position.

9. A device for increasing the braking action of compressed air brakes at high speeds, the combination with a brake cylinder and a pipe for the supply of compressed air thereto, of an auxiliary cylinder connected to said supply pipe, three electrically actuated valves associated with said auxiliary cylinder, one of said valves being a double-acting valve of which one member controls the supply of compressed air from said pipe to said auxiliary cylinder and the other member controls the outflow of compressed air from the auxiliary cylinder into the atmosphere, a second valve when in the de-energized position being normally closed and controlling the outflow of compressed air from said auxiliary cylinder to the atmosphere, the third valve when de-energized being open so as to allow compressed air to pass to the auxiliary cylinder, a pressure gauge connected to the pipe between the valve which controls the outflow from the auxiliary cylinder, contacts associated with said pressure gauge, a pressure gauge connected to the pipe between the brake cylinder and the valve which is open when de-energized, contacts associated with said pressure gauge, a speedometer, two sets of contacts associated with said speedometer, one set of contacts being adapted to close after a predetermined speed is reached and remain closed up to the end of the maximum range, whilst the other set of contacts is adapted to remain closed for a range of speed from zero to a point between the range at which the other contacts are closed, and to remain open during the remaining range of speed, whilst the contacts of the last mentioned gauge are adapted to close at a lower pressure than the contacts of the first mentioned gauge.

HANS GALLUSSER.

CERTIFICATE OF CORRECTION.

Patent No. 2,109,419.                                February 22, 1938.

HANS GALLUSSER.

It is hereby certified that error appears in the printed specification of the above numbered patent requiring correction as follows: Page 4, second column, line 36, claim 9, after the word "cylinder" and before the comma, insert and the auxiliary cylinder; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.